Nov. 5, 1946.                H. O. HEM                   2,410,654
                     AIRPLANE WEIGHING APPARATUS
                    Filed March 25, 1944      5 Sheets-Sheet 1
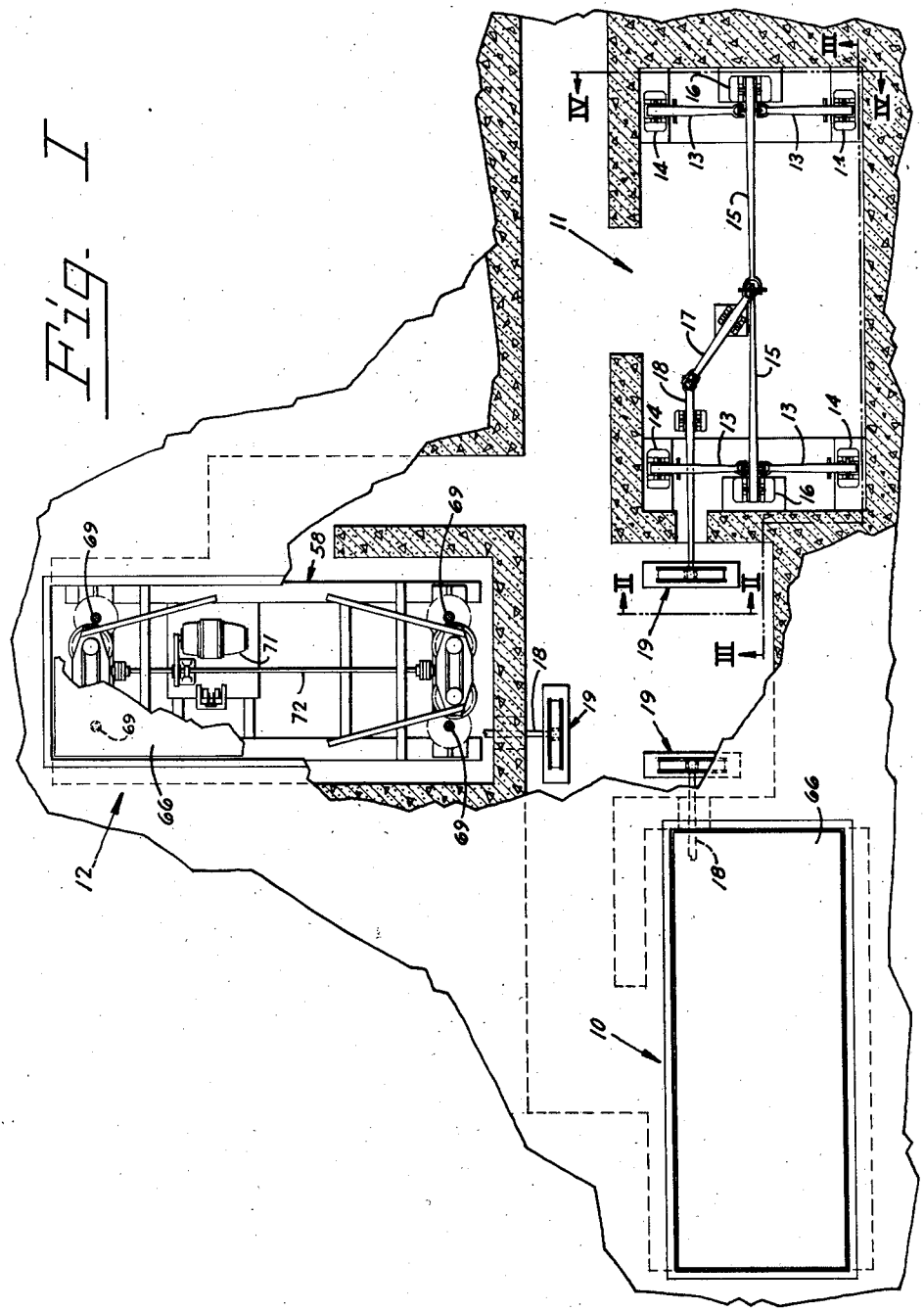
INVENTOR.
Halvor O. Hem
BY
Marshall & Marshall
ATTORNEYS Nov. 5, 1946.  H. O. HEM  2,410,654
AIRPLANE WEIGHING APPARATUS
Filed March 25, 1944　　5 Sheets-Sheet 2
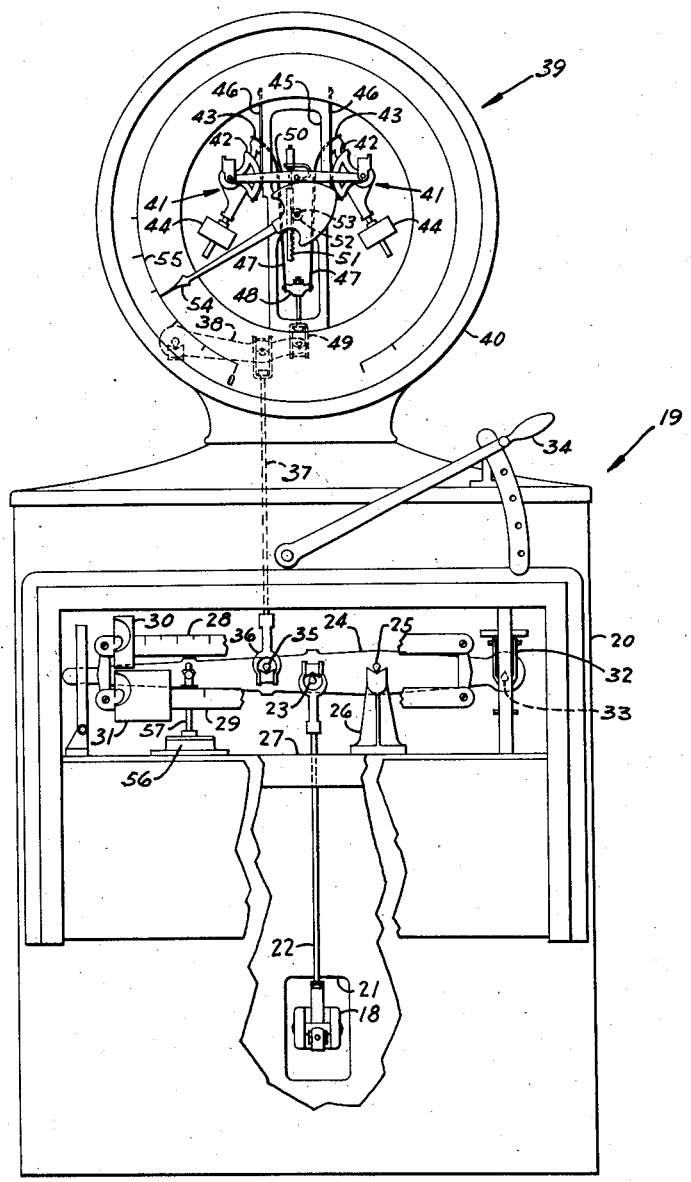
Fig. II
INVENTOR.
Halvor O. Hem
BY
Marshall & Marshall
ATTORNEYS

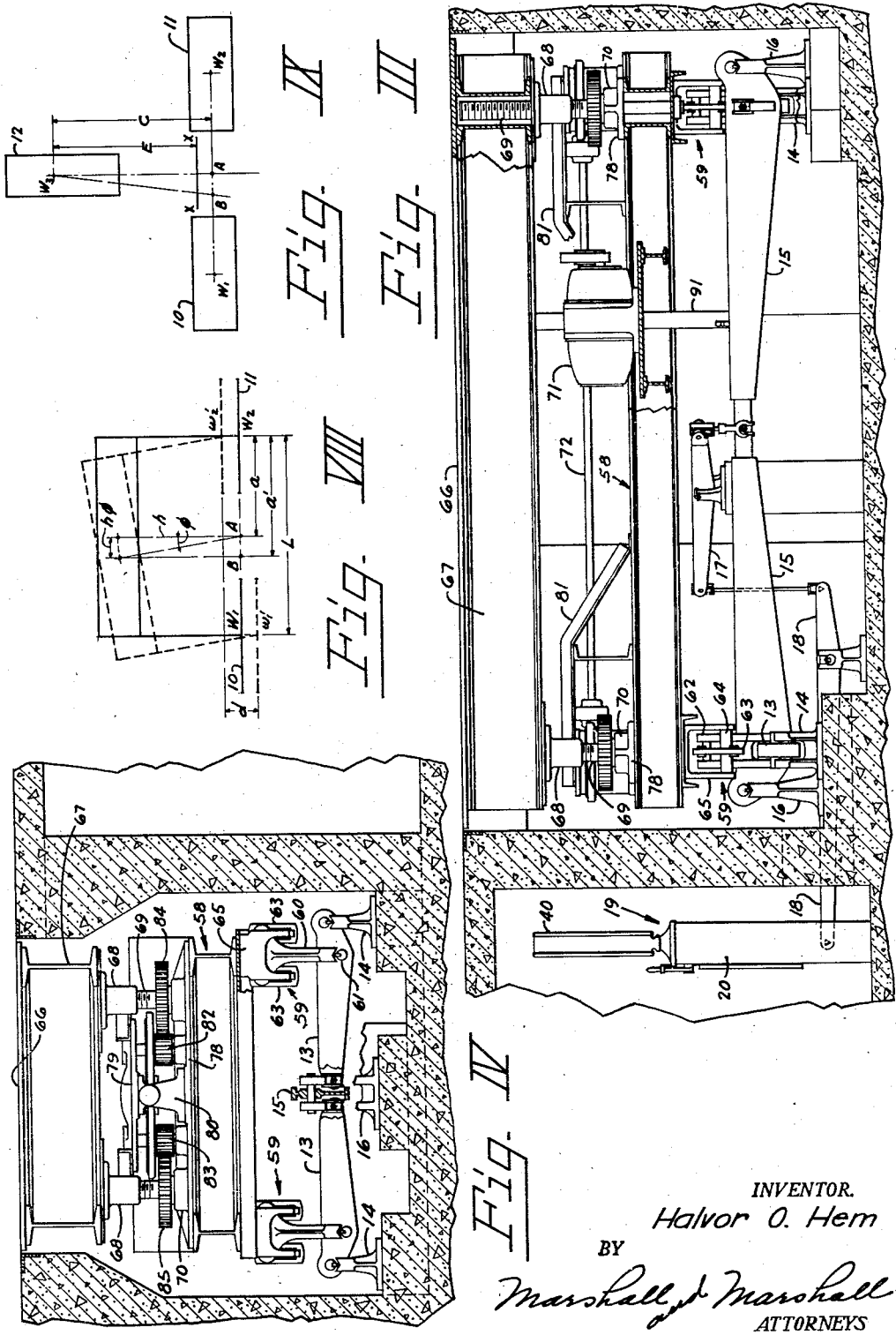

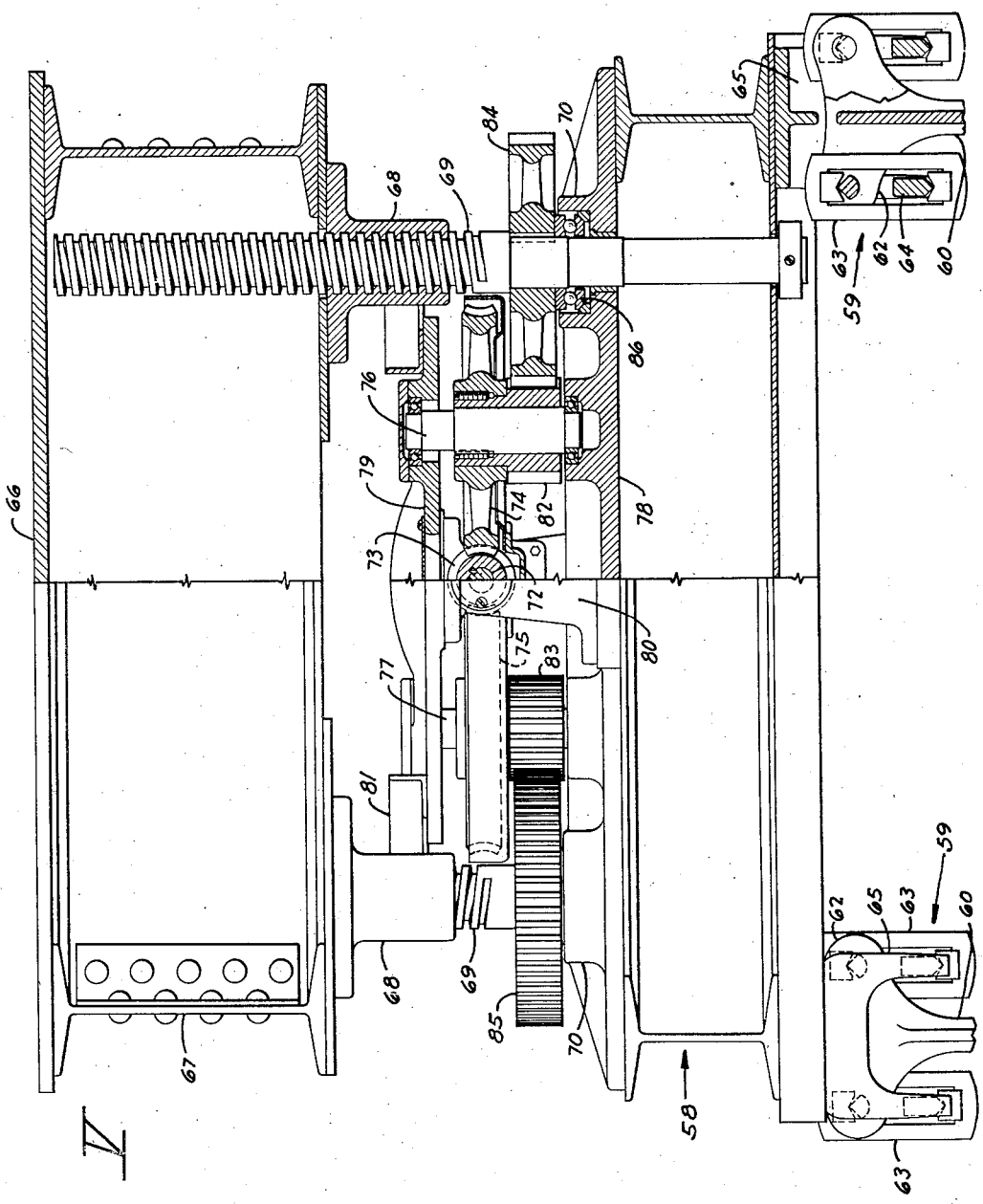

Nov. 5, 1946.   H. O. HEM   2,410,654
AIRPLANE WEIGHING APPARATUS
Filed March 25, 1944   5 Sheets-Sheet 5
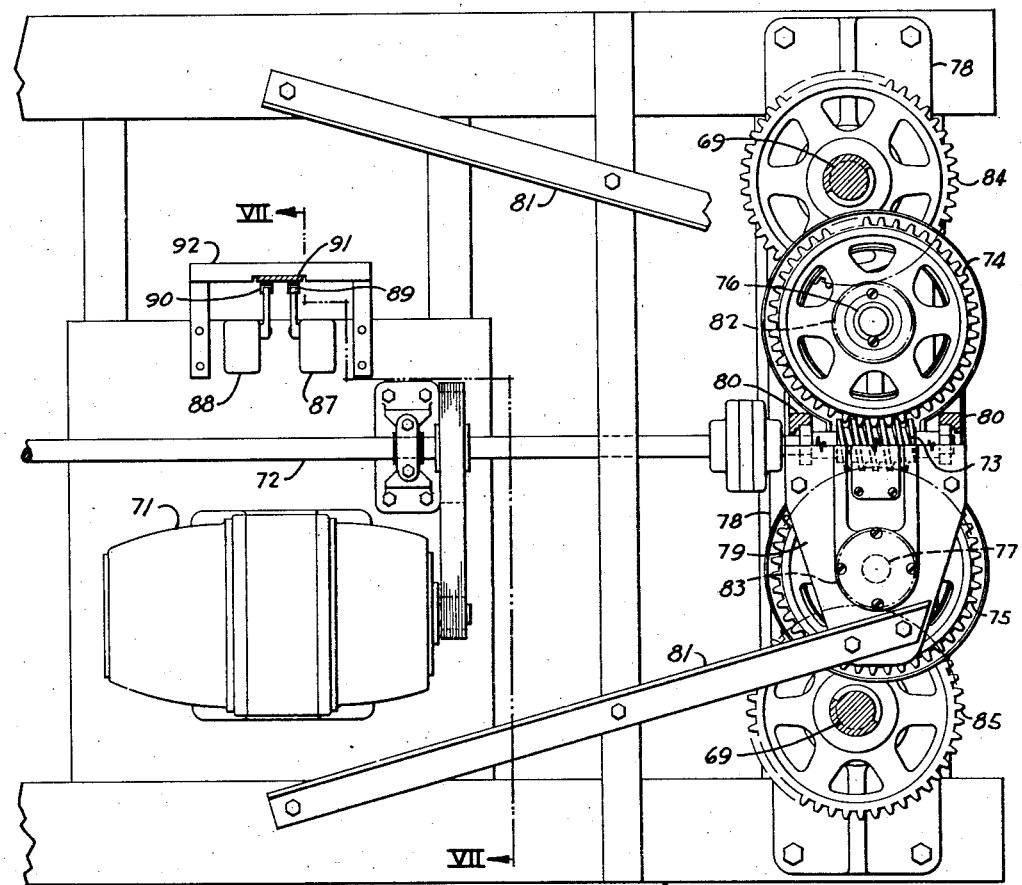
_Fig. VI_
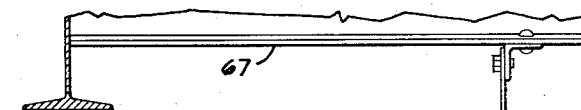
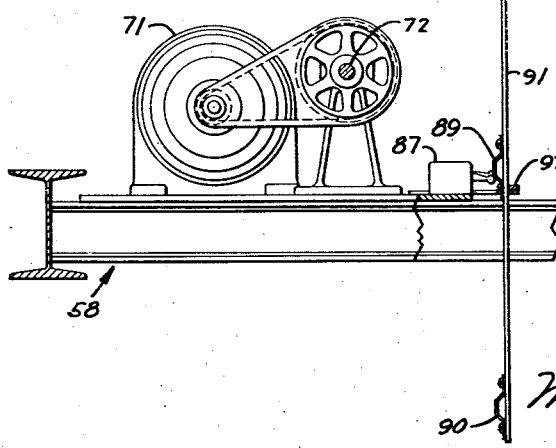
_Fig. VII_
INVENTOR.
Halvor O. Hem
BY
Marshall & Marshall
ATTORNEYS Patented Nov. 5, 1946

2,410,654

UNITED STATES PATENT OFFICE 2,410,654

AIRPLANE WEIGHING APPARATUS

Halvor O. Hem, Toledo, Ohio, assignor to Toledo Scale Company, Toledo, Ohio, a corporation of New Jersey Application March 25, 1944, Serial No. 528,083

2 Claims. (Cl. 73—65)

This invention relates to weighing scales and in particular to a combination of weighing scales adapted to determine the center of gravity of loads supported by the scales in combination. It is customary as a final test in the assembly of an airplane to determine its center of gravity with and without load. This is necessary to insure that the plane will be stable in flight and that it will respond correctly to its controls.

It has been common practice to provide three scales, one for each of the three ground engaging wheels of an airplane, and to calculate, using the weight indication of each scale, the position of the center of gravity. Such a procedure gives the horizontal location of the center of gravity but does not provide any information from which its vertical height may be determined.

The primary object of this invention is to provide a combination of weighing scales which by means of an elevating platform on each scale may be used to determine the height of the center of gravity as well as its horizontal position.

Another object is to provide a compact elevating mechanism suitable for use under the deck of a weighing scale.

These and other objects and advantages are apparent from the description, in which reference is had to the accompanying drawings illustrating a preferred form of the invention.

In the drawings:

Figure I is a plan view, partly in section, showing an arrangement of three substantially identical scales adapted to be operated according to the invention.

Figure II is a front elevation of one of the force counterbalancing and indicating mechanisms as seen from the line II—II of Figure I.

Figure III is a side elevation of one of the three scales shown in Figure I, the elevation being taken substantially along the line III—III of Figure I.

Figure IV is an end elevation taken substantially along the line IV—IV of Figure I.

Figure V is an end elevation, partly in section, of the platform elevating mechanism.

Figure VI is a plan view, partly in section, of the elevating mechanism as seen with the platform removed.

Figure VII is a fragmentary section taken along the line VII—VII of Figure VI.

Figures VIII and IX are schematic diagrams illustrating the computations involved in solving for the location of the center of gravity of a structure placed on the scales.

Three weighing scales 10, 11 and 12 of similar design each consisting of a lever system, an elevating mechanism and a platform are located in pits in the floor so that the platforms, when in their lowered position, are flush with the floor. The scales are so positioned relative to each other that an aircraft may be located thereon with one of its ground engaging wheels supported on each scale. In the arrangement shown in Figure I conventional aircraft may be located with the fixed landing wheels on the scales 10 and 11 and the tail wheel on the scale 12. If the aircraft is of the so-called tricycle landing gear type its nose wheel may be located on the scale 12.

In Figure I parts are broken away from the scales 11 and 12 to reveal the lever system of the scale 11 and the elevating mechanism of the scale 12.

The lever systems of the three scales are similar. Each comprises a set of main levers 13 supported on fulcrum stands 14 located near the corners of the enclosing pit. The main levers 13 are pivotally connected to end levers 15 which are fulcrumed on stands 16 located at the ends of each of the pits. The end levers 15 are pivotally connected to an extension lever 17. Another extension lever 18, pivotally connected to the extension lever 17, transmits force to a counterbalancing and indicating mechanism 19.

The counterbalancing and indicating mechanism 19, shown in detail in Figure II, is housed in a cabinet 20. The extension lever 18 which enters the cabinet 20 through an opening 21 in the rear wall thereof is pivotally connected to a steelyard rod 22 suspended from a load pivot 23 of a tare beam lever 24. The fulcrum pivot 25 of the tare beam lever 24 rests on bearings in a fulcrum stand 26 erected from a shelf 27 of the cabinet 20. The tare beam lever 24 is provided with beams 28 and 29 fitted with poises 30 and 31 respectively which may be used to counterbalance part of the load supported by the lever system. A unit weight hanger 32 extending into the cabinet below the shelf 27 is suspended from a pivot 33 of the tare beam lever 24. Unit weights for increasing the capacity of the scale may be engaged by operating a handle 34 which is operatively connected to a unit weight supporting mechanism enclosed in the cabinet 20 below the shelf 27.

A power pivot 35 in the tare beam lever 24 is operatively connected through a stirrup 36, steelyard rod 37, and a pendulum lever 38 to an automatic counterbalancing mechanism 39 enclosed in a substantially watchcase-shaped housing 40 surmounting the cabinet 20. The automatic counterbalancing mechanism 39 comprises a pair of pendulum bodies 41 each of which is fitted with arcuate surfaces 42 and 43 and a pendulum mass 44. The pendulum bodies 41 are suspended from a vertical rectangular frame 45 by means of metallic ribbons 46 which overlie the arcuate surfaces 42. Load is applied to the pendulum bodies 41 through a pair of ribbons 47 overlying the arcuate surfaces 43, the lower ends of the ribbons 47 being connected to a yoke 48 which by means of a connection 49 is pivotally attached to the pendulum lever 38. Because the radius of the arcuate surfaces 43 is greater than the radius of the arcuate surface 42 any downward force applied to the ribbons 47 results in the pendulum bodies rolling upward along the sides of the frame 45. This upward motion with load is transmitted through compensating bars 50 and a rack 51 attached thereto to drive a pinion 52 mounted on an indicator shaft 53 and thus rotate the shaft and an attached indicator 54. The end of the indicator 54 sweeps over an annular chart 55 on which weight graduations are inscribed.

Oscillations of the indicator and counterbalancing mechanism with changes in load are controlled by a dashpot 56 whose stem 57 is pivotally attached to the tare beam lever 24.

Each of the lever systems supports a skeletonized subplatform or frame 58. Parallel link suspensions 59 interposed between the subplatform 58 and the lever systems allow a limited horizontal motion of the supported structure without imposing lateral forces to the knife edges in the main levers 13. Each of the parallel link suspensions 59 comprises a T shaped member 60 whose stem is bifurcated to straddle the cooperating main lever 13 and engage the load pivots 61 therein. The cross-arms 62 of the T shaped member 60 are also bifurcated and fitted with pins from which links 63 are suspended. The links 63 engage and support crossbars 64 of a U shaped bracket 65 attached to the undersurface of the subplatform 58.

Each of the scales is further provided with a load receiving platform 66 supported on girders 67. The girders 67 at the corners of the platform 66 rest on large shoulder nuts 68 threaded upon vertical elevating screws 69 which are journaled in bearings 70 mounted on the subplatform 58. Rotation of the elevating screws 69 thus raises or lowers the platform 66 without affecting the indication of a load which might be carried thereon.

A motor 71 supported on the subplatform 58 provides power for rotating the elevating screws 69. The motor 71 is belt connected to a shaft 72 which extends longitudinally along the subplatform 58 and which at each end is provided with a worm 73. Each of the worms 73 drivingly engages two worm wheels 74 and 75 mounted on vertical shafts 76 and 77. The lower ends of these shafts are journaled in crossmembers 78 of the subplatform 58 and the upper ends are journaled in plates 79 disposed parallel to and above the crossmembers 78. The plates 79 are supported on bearing stands 80 (which journal the ends of the shafts 72 carrying the worm 73) and are stiffened by braces 81 attached to adjacent sides of the subplatform 58. The shafts 76 and 77 also carry pinions 82 and 83 meshing with gear wheels 84 and 85 mounted on the elevating screws 69.

The downward thrust of the platform through the elevating screws 69 is carried by thrust bearings 86 forming a portion of the bearings 70.

It should be noted that some of the elevating screws have right hand threads and the remainder left hand threads. This difference in threads is necessary because the gear trains on opposite sides of the worms rotate in opposite directions.

The motor 71 must be of a readily reversible type and may be controlled by push button stations located in positions convenient for the operator. These control systems should incorporate limit switches 87 and 88 mounted on the subplatform 58 and actuated by cams 89 and 90 when the platform 66 approaches its safe limits of travel. A strip 91 carrying the cams 89 and 90 extends downward from the under structure of the platform 66 and is guided by a bracket 92 secured to the subplatform 58 adjacent the limit switches 87 and 88.

Operation

The airplane or other structure whose center of gravity is to be determined is placed upon the three scales in such a manner that a portion of its weight is carried by each scale. It is also desirable that the surfaces in contact with the scales be kept as small as practical in order that the center of pressure on that scale may be accurately determined. When the airplane or other structure is so located, the three platforms are elevated to their midposition and the weight readings are taken. The reading of scale 10 will be referred to as $w_1$, that of scale 11 as $w_2$ and scale 12 as $w_3$. The horizontal projection of the center of gravity may be located from these three readings by considering that the airplane or other structure is comprised of three masses, equivalent to $W_1$, $W_2$, and $W_3$ each located at the point of contact of the load on that particular scale. The center of gravity of the combination of $W_1$ and $W_2$ lies on a line connecting these and divides the line into two segments whose lengths are inversely proportional to the adjacent masses. Then the center of gravity of the three masses lies on a line connecting the center of gravity of $W_1+W_2$ and $W_3$ and divides this line into two segments inversely proportional to the effective masses at its ends. The point so located is the horizontal projection of the center of gravity of the airplane or other structure and thus defines the location of the center of gravity except for its height above the horizontal plane through the scale platforms.

To determine the vertical height of the center of gravity above the plane of the platforms, the aircraft is tilted first one way and then the other by selectively raising and lowering the platforms of the scales 10 and 11 leaving the platform of scale 12 in its midposition. After lowering the platform of the scale 10 and raising the platform of the scale 11 the readings of these scales are again taken and are designated as $w_1'$ and $w_2'$. Another set of readings are taken with the platform of scale 10 raised to its full height and the platform of scale 11 dropped. These readings are designated as $w_1''$ and $w_2''$. The reading of scale 12, i. e. $w_3$, will not be affected by the tilting as long as the platforms are raised and lowered equal amounts. In Figure VIII the difference in the height between the platforms when the structure thereon is tilted is indicated by the symbol "$d$" and the distance between the points of contact of the load on the scales 10 and 11 by the length "$L$." Then the angle of tilt "$\phi$" is substantially equal to $d/L$, (since for small angles $\tan \phi$ is equal to the angle $\phi$ in radians). The distance $a$, Figure VIII, is the distance from the mass $W_2$ to the center of gravity of the combination of the masses $W_1$ and $W_2$. Therefore, $$a = \frac{W_1}{W_1+W_2}L$$

The projection of the actual center of gravity lies on a line connecting A (the center of gravity of $W_1+W_2$) and $W_3$ at a distance from $W_3$ equal to "$E$" where "$E$" is defined by the equation $$E = \frac{W_1+W_2}{W_1+W_2+W_3}C$$

wherein C is equal to the distance from A to $W_3$.

After tipping the airplane by lowering the platform 10 and raising the platform 11 equal amounts of the center of gravity will be shifted along a line parallel to the line connecting $W_1$ and $W_2$ such as the line $x$—$x$ in Figure IX. This tilting also shifts the apparent center of gravity of the load carried on the scales 10 and 11 to a point B whose distance from $W_2$ is $a'$ where $$a' = \frac{w_1'}{w_1 + w_2} L$$

$w_1'$ being the weight indication of scale 10 when its platform is lowered. This shift in the horizontal projection of the center of gravity is equal to the height of the center of gravity multiplied by the angle of tilt $\phi$, thus:

$$a' - a = h\phi$$

Similarly when the airplane is tilted the other way the apparent center of gravity is shifted the other way so that its distance from $W_2$ is $a''$ where $$a'' = \frac{w_1''}{w_1 + w_2} L$$

Thus the total shift $a' - a''$ expressed in terms of weight readings and the distance L is:

$$a' - a'' = \frac{w_1' - w_1''}{w_1 + w_2} L$$

Also, assuming the angle of tilt is the same each way:

$$a' - a'' = 2h\phi = \frac{2hd}{L}$$

Solving these for $h$ gives:

$$h = \frac{L^2(w_1' - w_1'')}{2d(w_1 + w_2)}$$

This equation for $h$ gives the apparent height of the center of gravity in the vertical plane through A and B. The actual height is less in the proportion of "E" to "C," i. e. in proportion of mass $W_1 + W_2$ to the total. Therefore, the actual height "H" in the plane through $x$—$x$ is:

$$H = \frac{L^2(w_1' - w_1'')}{2d(w_1 + w_2)} \times \frac{(w_1 + w_2)}{w_1 + w_2 + w_3}$$

$$H = \frac{L^2(w_1' - w_1'')}{2d(w_1 + w_2 + w_3)}$$

Thus the actual height of the center of gravity is equal to the result of dividing the square of the distance between the supporting points times the change in weight as indicated on one of the scales by twice the change in platform elevation times the total weight.

The center of gravity of an airplane may thus be completely determined by a series of weight measurements combined with the linear measurements between the points of contact of the airplane and the respective scales and the elevation of the platforms.

While the scales have been described in connection with center of gravity determinations of a structure supported at three points, it is also apparent that the same principle may be utilized for similar measurements on objects supported on four points. In this case two scales would be arranged side by side. The object would first be placed on the scales such that the two points on one side would be on one scale and the other points on another, and the readings taken at both level and tilted conditions. From these weight readings the transverse plane and the height of the center of gravity in such plane may be determined. The object is then shifted ninety degrees and a similar set of weighings taken. From these another vertical plane containing the center of gravity may be determined. The actual center of gravity is located in the intersection of these two planes at a height determined by the weighings taken when the object is tilted.

Thus a system of scales is shown which with a minimum of expense and manipulation will permit a complete measurement of the distribution of weight of a structure placed upon them.

Having described the invention, I claim:

1. In a device for determining the distribution of weight of an object supported jointly on a plurality of scales, in combination, a platform, a frame supported on a scale lever system, a plurality of screws supporting said platform from said frame, and means for rotating said screws synchronously.

2. In a device for determining the center of gravity of an object by supporting it on a plurality of scales acting jointly, means for tilting the object to produce an apparent shift in the horizontal position of its center of gravity, said means comprising a platform supporting part of the object, a frame on a lever system, a plurality of screws supporting said platform from said frame and a motor and gears adapted to rotate said screws.

HALVOR O. HEM.